United States Patent [19]
Asselin

[11] Patent Number: 5,296,767
[45] Date of Patent: Mar. 22, 1994

[54] EFFICIENT MAGNETIC MOTOR ARMATURES

[75] Inventor: Pierre Asselin, Santa Barbara, Calif.

[73] Assignee: Applied Magnetics Corporation, Goleta, Calif.

[21] Appl. No.: 105,872

[22] Filed: Aug. 11, 1993

Related U.S. Application Data

[63] Continuation-in-part of Ser. No. 745,447, Aug. 15, 1991.

[51] Int. Cl.$^5$ .......................................... H02K 41/02
[52] U.S. Cl. ...................................... 310/13; 310/156
[58] Field of Search ............... 310/13, 156, 181, 190, 310/193, 226, 256; 360/106; 335/236

[56] References Cited

U.S. PATENT DOCUMENTS

| | | | |
|---|---|---|---|
| 4,414,657 | 11/1983 | Arquie et al. | 369/45 |
| 4,450,547 | 5/1984 | Nakamura et al. | 369/45 |
| 4,498,023 | 2/1985 | Stout | 310/14 |
| 4,546,277 | 10/1985 | Carbonneau et al. | 310/13 |
| 4,763,314 | 8/1988 | McCaslin et al. | 369/249 |
| 4,882,508 | 11/1989 | Mawla | 310/13 |
| 4,945,330 | 7/1990 | Arita | 335/229 |
| 5,191,256 | 3/1993 | Reiter, Jr. et al. | 310/156 |

OTHER PUBLICATIONS

Lillig, "Dynamic Force Factor of a Linear Voice Coil Motor", 1988–1989, pp. 13–21.
Chai et al., "Voice Coil Motors For Disk Storage Applications," 1988–1989, pp. 143–154.
Heine et al., "A Comparison of Rotary Actuator Structure and design Parameters versus Performance", 1988–1989, pp. 155–161.
Lissner et al., "Empirical Evaluation of Voice Coil Motors For Disk Storage Applications," 1988–1989, pp. 29–33.

Primary Examiner—Steven L. Stephan
Assistant Examiner—D. R. Haszko
Attorney, Agent, or Firm—Marvin E. Jacobs

[57] ABSTRACT

A permanent magnet motor or actuator, such as the voice coil motors used in disk drives to position read/write heads, with an armature to magnet interface or junction modified to expand the magnetic material into regions of the armature that carry less than the maximum possible magnetic flux so as to have increased flux strength without inducing leakage of the flux out of the armature. Reduced flux regions include outside corners of the armature, places where the flux divides into two paths, and parts of the armature that have comparatively longer flux lines.

7 Claims, 4 Drawing Sheets

EFFICIENT MAGNETIC MOTOR ARMATURES

This is a continuation-in-part of pending prior application Ser. No. 07/745,447, filed Aug. 15, 1991.

TECHNICAL FIELD

This invention relates to the field of permanent magnet actuators and motors, especially very efficient designs such as those used in the computer arts as voice coil motors (VCM) to position the read/write heads at precise positions on magnetic storage disks or optical storage disks.

BACKGROUND OF THE INVENTION

Contemporary computer non-volatile random access mass data storage is often provided by either magnetic disks, such as floppy or hard disks, or optical disks. The magnetic media are accessed with magnetic read/write heads while the optical disks are written and read by lasers. Either type of device is best positioned at the desired location on the disk with a voice coil motor that derives its motive force from a current carrying coil moving in a magnetic field. The magnetic field usually is generated by permanent magnets.

Although the present invention is applicable to any type of magnetic motor, its benefits are especially welcome in the VCM technology where design constraints are particularly stringent. Voice coil motors use permanent magnets to generate magnetic flux, through armatures, to a gap. A coil of wire in the gap is moved by the flux when current is conducted through the coil. The force on the coil is proportional to the current. The coil is, in turn, mechanically connected to suitable structures to move the read/write heads or laser optics.

The armature shape is very important. Since the permanent magnets and armatures must often move with the heads or optics, they contribute to the moving mass and seriously affect seek time. Thus, a minimum weight permanent magnet and armature are required. This conflicts with other needs, however. For maximum motive force, it is important to have a high and uniform flux density in the gap so as to produce a high force in the coil with reduced power dissipation. Uniform flux is needed to keep the force constant as the coil moves in the gap. And yet, the flux must not be allowed to exceed the level that the armature can contain since flux leakage from the armature could be disastrous to the magnetic storage media which operate in very close proximity to the voice coil motor. Optical systems also store data in frozen magnetic domains on the surface of the disk. Spurious magnetic fields could erratically change or erase data.

VCM designers, then, strive for a careful balance of all of the above factors. The most powerful neodymium magnets are used to produce the strongest flux fields for the lightest weight. Armatures are shaped to have just the cross sectional area needed to carry the flux without leakage, and no larger, so as to achieve the lightest weight. Coils may even be wound from square wire to carry the maximum current at the smallest size and weight. As a consequence, VCM's have been built that seek to the selected data track very fast and, in the case of optical systems, focus optics on the data track very fast. Despite these advances, faster data access is a never ending goal. To make even more efficient VCM devices, this invention discloses an improved magnet and armature design which allows still further improvements in the efficiency of the VCM magnetic circuits.

SUMMARY OF THE INVENTION

Briefly, an optimized interface between the magnets and the armature is described herein which expands the magnetic material into portions of the armature which are not fully utilized for the conveyance of flux. Since VCM designs are usually very compact and configured with twin magnetic loops for symmetric and balanced operation, they almost invariably have T shaped junctions and sharp corners within which regions of reduced flux are inevitable. It has been found that the magnets can be extended into these reduced flux regions of the armature without crowding out the flux carrying ability of the armature, which crowding would force flux leakage out of the armature. The extra amount of magnet material generates more flux through the gap in the armature, and the coil in the gap, so that more motive force on the coil is obtained or the same force is possible with smaller coils or less coil current. With this enhancement, VCM's are possible that are both more powerful and lighter. Thus, faster seek times and data access are possible. Additional benefits and advantages are elucidated in the detailed description below that references the drawings.

DETAILED DESCRIPTION OF THE INVENTION

Figure 1:
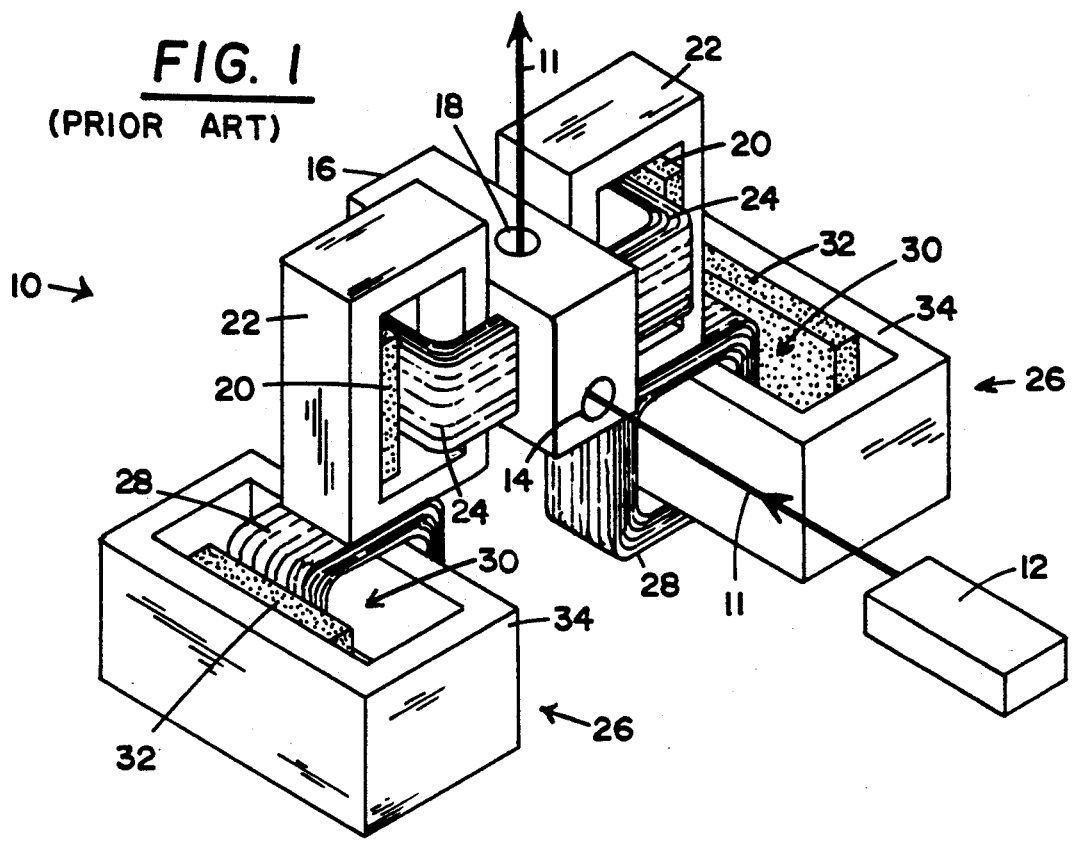
FIG. 1 shows, in a highly simplified, schematic, perspective view, a typical prior art disk head actuator that employs several permanent magnet motors to control the position of an optical laser beam that scans the disk.

To help explain one possible context of the present invention, a prior art permanent magnet voice coil motor operated actuator 10 is shown in FIG. 1. In this case, an actuator is described which might be used in the reading and writing of an optical disk. A laser beam 11 from a source 12 enters an aperture 14 in an optics containing housing 16 and exits upward through a focusing lens 18. The optical disk rotates just above actuator 10.

To focus the beam 11 on the surface of the disk, housing 16 and lens 18 are moved up and down by a pair of permanent magnet motors. These motors each have a magnet 20 mounted inside an armature 22. Magnets 20 generate magnetic flux toward housing 16, through a coil of wire 24, into the vertical portion of their armatures 22 inside coil 24, where the flux splits up and down to follow the armature 22 around to return to the opposite pole of the magnets 20. Coil 24 is attached to housing 16. When current is circulated through coil 24, a vertical force acts on coil 24 resulting from the flux of the magnets 20. The direction of the current determines the direction of the vertical force.

To move the housing 16 to direct beam 11 on the selected track on the disk, another pair of permanent magnet motors 26 are used. A pair of coils 28 travel horizontally in a pair of gaps 30 which have magnetic flux thereacross from magnets 32 and armatures 34.

The actuator of FIG. 1 is described in greater detail in United States patent application Ser. No. 07/657,155, filed Feb. 15, 1991, assigned to the assignee of this application, now U.S. Pat. No. 5,265,079. The teachings of this copending application are hereby incorporated by reference into the instant application.

All of the apparatus shown in FIG. 1 must fit within a disk drive of limited space and, thus, must be compact and not leak stray magnetic fields onto the storage media. For fast track seeking, however, coils 28 need to be large enough to carry sufficient force generating currents and/or magnets 32 need to be large enough to generate strong fluxes. Fast focusing demands the same conflicting requirements, and has the further complication that any additional weight must be accelerated by the track seeking motors 26. Clearly, any improvement in the efficiency of the motors has manyfold consequences for the entire system.

Figure 2:
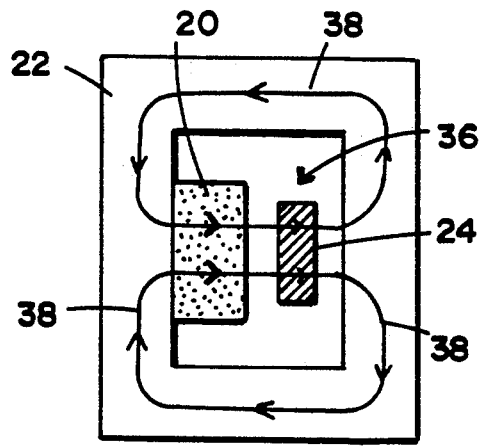
FIG. 2 schematically shows one of the motors of FIG. 1 and the flux paths therein.

One of the focusing motors is schematically shown in FIG. 2. Coil 24 is sectionally shown in a gap 36 between magnet 20 and armature 22. The prior art magnet 20 produces flux across gap 36, generally orthogonal to coil 24, that follows a two way path indicated by arrows 38. Electrical current in coil 24 (perpendicular to the plane of the drawing) reacts with flux 38 to force coil 24 along a vertical path in FIG. 2 in accordance with well known principles of magnetism.

Figure 3:
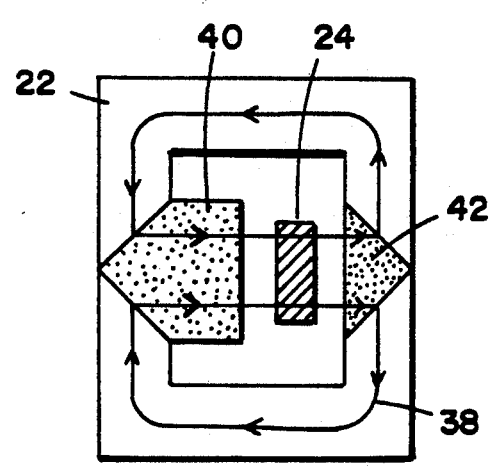
FIG. 3 shows the improved magnet to armature interface of the present invention as applied to a motor of the type shown in FIG. 2.

The preferred embodiment of the invention for this type of motor armature is shown in FIG. 3. A five sided magnet 40 replaces magnet 20. Magnet 40 is essentially magnet 20 extended into the armature in such a way as to not detract from the flux carrying capability of the armature. In addition, a three sided magnet 42 is placed in series with magnet 40, extending into the right side of the armature in a region of reduced flux where, once again, the flux capacity of the armature is not substantially impaired. It should be noticed that the quantity of magnetic material has been considerably increased, with a consequent increase in the flux strength and yet the overall shape of the motor remains constant. Preservation of the mechanical outline permits easy modification of existing designs. Alternatively, the entire structure may be reduced in size if compactness is a higher design priority than faster actuator movement. Motors can therefore be made smaller or higher in performance.

The high energy permanent magnets commercially available for this purpose are usually pressed into shape and sintered and can be readily reshaped as needed to fill armature reduced flux regions. The FIG. 3 embodiment has been found to be about twenty percent more efficient than the conventional arrangement of FIG. 2.

Figure 4:
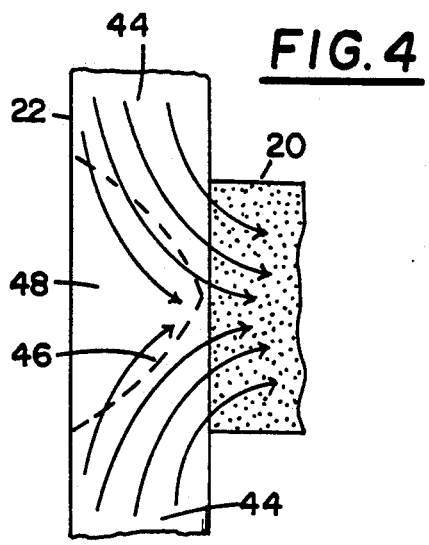
FIG. 4 is an enlarged fragmentary view of a magnet to armature interface or junction showing how regions of reduced flux exist that may be used to contain additional magnet material.

In FIG. 4, a fragmentary view of a typical magnet to armature interface is enlarged to better show the flux density pattern in such a region. Flux 38 is quite dense in the magnet 20 and in the armature above and below the magnet at locations 44. But where the flux splits in two, in an area 48 generally within dashed line 46, flux density is lessened over a short distance. The portion of the armature 48, may have little or no flux in it. Hence, permanent magnet material may be added to the armature in these reduced flux regions without causing flux leakage or adding weight.

Figure 5:
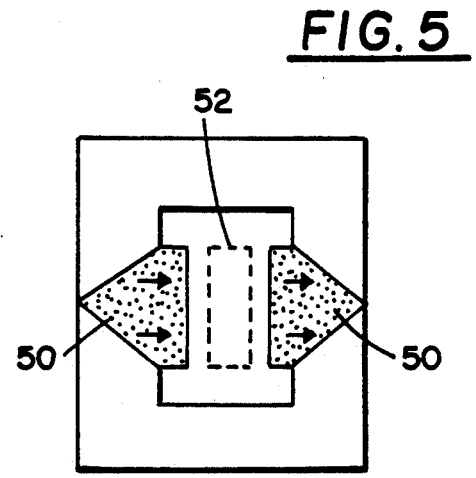
FIGS. 5–11 and 13 show a variety of exemplary other embodiments of the invention in which magnetic material has been expanded into regions of the armature with reduced flux.

Alternative embodiments of the invention are shown in FIGS. 5-11 and 13. In FIG. 5, a pair of similar pentagonal magnets 50 are used rather than the pentagonal and triangular magnets of FIG. 3. This arrangement produces a slightly stronger flux through the gap (the gap is indicated by dashed line 52) than the FIG. 3 embodiment. However, since gap 52 is centered, rather than offset as in FIG. 3, coil 24 will have to extend farther from the housing 16. Coil 24 is, thus, larger, heavier and somewhat springier due to its longer unsupported length. This may, in some cases, create a greater disadvantage than warranted by the increased magnetic field strength. In FIG. 5, as in subsequent Figures, the arrows drawn within the magnets indicate the direction of magnetization.

Figure 6:
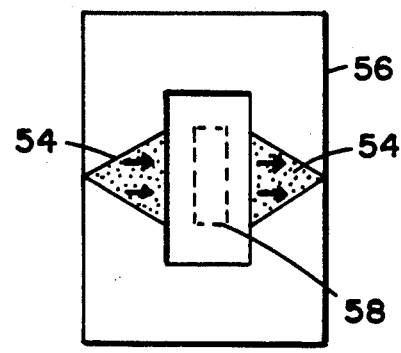
Figure 8:
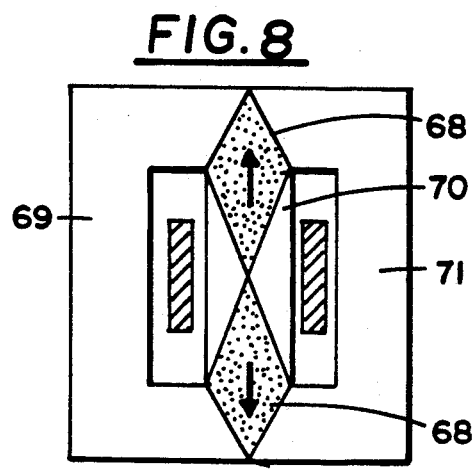

FIG. 6 shows an embodiment with two triangular magnets 54 buried completely within the reduced flux regions of an armature 56. With this arrangement, gap 58 can be smaller than ever before if a reduced quantity of magnetic material can be tolerated. Of course, the embodiments of FIGS. 5 and 6 could utilize just a single magnet on one side of the gap for a simpler and lower cost design.

Figure 7:
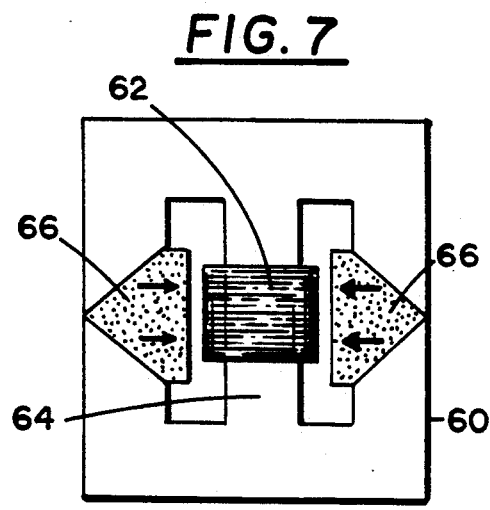

FIG. 7 shows a dual path armature 60 with a coil 62 about a center pole 64. Flux from a pair of magnets 66 flows around armature 60 and enters center pole 64 in parallel. The same sort of structure is presented in FIG. 8, however, the magnets 68 are mounted in series within center pole 70. An embodiment that uses both the series magnets of FIG. 8 and the parallel magnets of FIG. 7 in one dual path armature is also a possibility.

Figure 9:
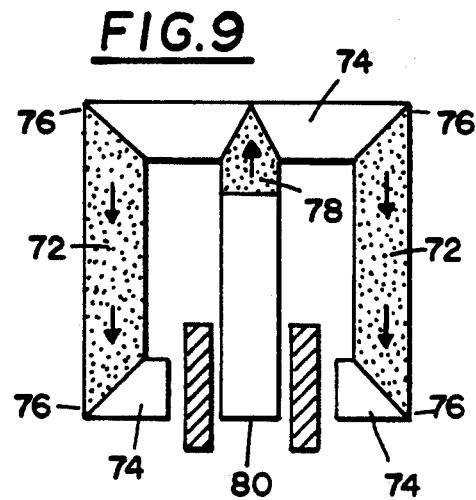

Some dual path armatures are made with magnets forming the vertical side legs as in FIG. 9. Modification according to the teachings of this invention extends the ends of the magnets 72 into the reduced flux regions at the remote corners 76 of the armature 74. Still another embodiment employs a magnet 78 in series with the center pole 80, either by itself, or in conjunction with the side magnets as drawn in FIG. 9.

Figure 10:
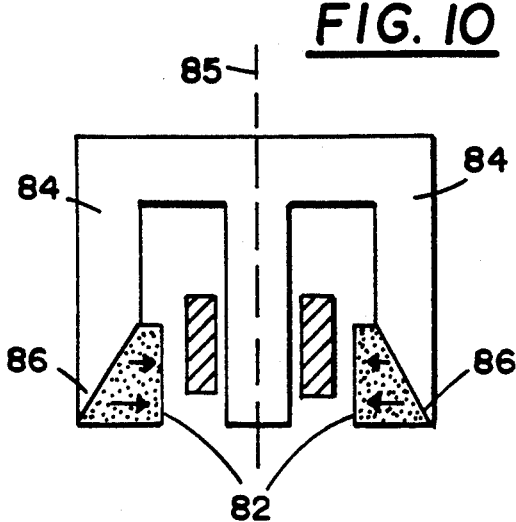

FIG. 10 is an embodiment with a pair of magnets 82 positioned on the inside surface of two side poles 84, as in the prior art, but extended into the reduced flux corners 86 in accordance with the principles of this invention. Dashed line 85 represents a possible axis of symmetry about which the magnets and armature could comprise cylindrical shapes.

Figure 11:
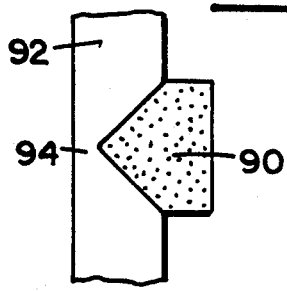

FIG. 11 emphasizes the fact that the magnet 90, when expanded into low flux regions of an armature 92 need not extend all the way through the armature to the opposite side but may stop short and leave an area of the armature 94 to carry bypassing flux induced by external sources.

Figure 12:
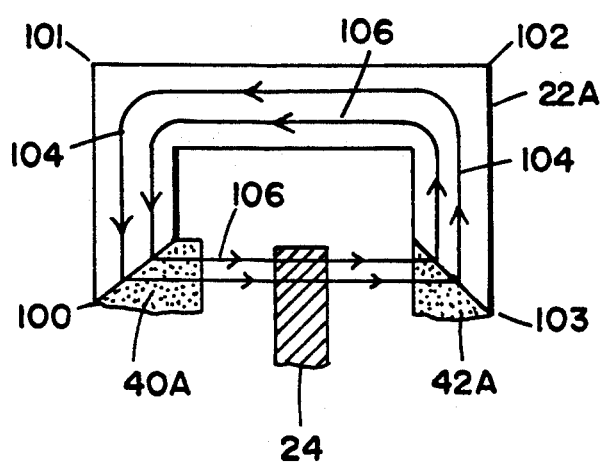
FIG. 12 is a diagram of the generalized flux lines that produce regions of reduced flux.

FIG. 12 diagrams the way reduced flux regions are defined and exploited by this invention. In FIG. 12 a generalized diagram is shown that may be thought of as one half of an armature flux path. For example, the diagram of FIG. 12 is similar to the top half of the structure of FIG. 3. Since the flux carrying armature 22A must loop from one pole of magnet 40A around to the opposite side of coil 24 in order to conduct flux through coil 24, the armature 22A must turn corners 100, 101, 102, and 103. The armature becomes effectively wider across the diagonals at these corners and the flux density is thus lower there. Flux line 104 is longer than flux line 106 and the parts of the magnetic material 40A and 42A that are aligned with the longer line 104 are extendable to greater lengths so as to fill out the corners. This is generally true in a geometric sense so that the parts of the magnets that align with longer flux lines may be, themselves, longer without quenching the flux in the armature. Another way to express this shape modification is to note that outside corners of the armature, like corners 100-103 in FIG. 12, corners 76 in FIG. 9, and corners 86 in FIG. 10, are filled with magnetic material. Even magnets 68 in FIG. 8 may be thought of as vertically split down the middle so as to be filling the outside corners of dual armature paths 69 and 71.

Figure 13:
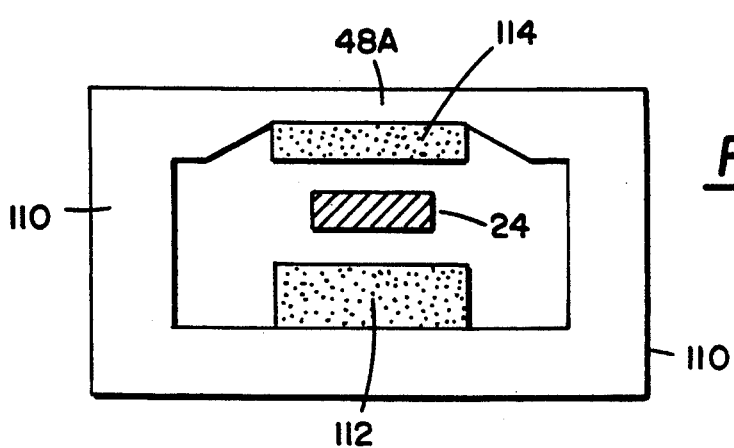

FIG. 13 shows yet another embodiment of the invention in which special shapes of magnets are avoided. Instead, off the shelf, commercially available rectangular magnets 112 and 114 are mounted within an armature 110. Since flux from magnet 114 splits left and right into two paths in FIG. 13, there is a reduced flux region 48A in armature 110 similar to the reduced flux region 48 discussed with respect to FIG. 4. Accordingly, a part of armature 110 may be made thinner in region 48A and a rectangular magnet 114 placed in the space made available by this thinning. Coil 24, magnet 112, and the outside profile of the armature 110 remain unaffected so that modification of existing designs is easier. Rectangular magnets, like magnet 114, are easier to obtain and lower in cost. Although the embodiment of FIG. 13 is not as effective as the more efficient designs of FIGS. 3, 5 and 6, it is cheaper and easier to fabricate.

Figure 14:
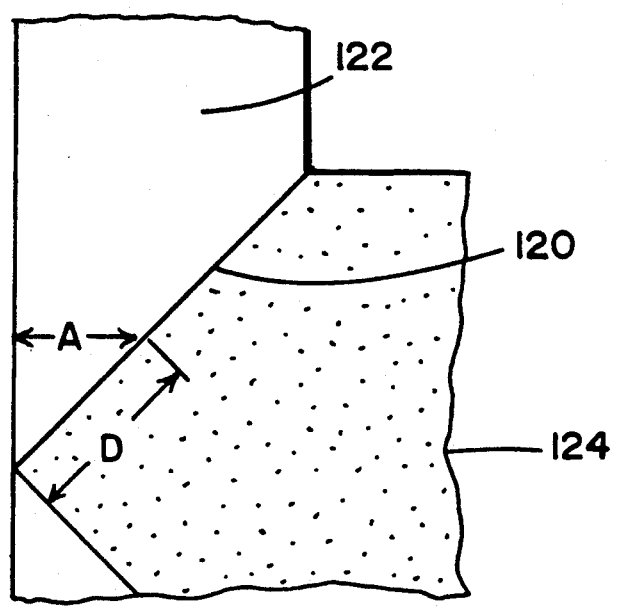
FIG. 14 is an enlarged fragmentary view of a magnet to armature interface in which the present invention is employed, showing mathematically how the cross sectional area of the armature varies as it is measured along the interface.

Extension of the magnetic material into reduced flux regions of the armature, in the most efficient manner, results in an armature cross section that may be characterized mathematically, as shown in FIG. 14. FIG. 14 diagrams an interface 120 between an armature 122 and a magnet 124 that extends into reduced flux regions of armature 122. FIG. 14 is a generic representation of the various embodiments of the invention. The cross sectional area of the armature A, whether measured perpendicular to the armature, as shown, or perpendicular to the interface, varies along the interface in a substantially linear manner. If the distance along the interface is defined to be D, as shown in FIG. 14, the armature cross sectional area A may be described by the formula:

$$A = kD$$

where k is substantially a constant.

Clearly, many variations are possible that do not depart from the spirit and scope of the invention. And the invention is applicable to all permanent magnet actuators in addition to the VCM applications highlighted in this specification. Some of these actuators are rotary in their motion, using curved magnets. Other magnetic circuit actuators include stepper motors and loudspeaker motors. Hence, the invention should be limited only in accordance with the appended claims and their equivalents.

I claim:

1. In a permanent magnet actuator of the type wherein permanent magnetic material is positioned adjacent to a magnetic flux carrying armature so as to generate magnetic flux through the armature, and the armature has a gap therein across which said flux is conducted, and an electrically conductive coil is located in said gap so as to be subjected to a motive force from said flux proportional to the electric current in the coil, the improvement comprising:

a portion of said magnetic material being extended into a reduced flux region of said armature in such a way that the cross sectional area of the armature A is related to the distance D along the interface between the armature and magnetic material substantially by the formula : $A = kD$, where k is a constant.

2. The actuator of claim 1 in which said magnetic material is extended into the outside corners of said armature.

3. The actuator of claim 1 in which said armature comprises a generally rectangular loop with an inside surface and an outside surface, said gap being inside the loop, and said magnetic material being between said inside surface and said coil in said gap.

4. The actuator of claim 3 in which the magnetic material is located on both sides of said coil.

5. The actuator of claim 1 in which said armature comprises a generally rectangular loop with an inside surface and an outside surface, said gap being across the loop, and said magnetic material being in series with and a part of said loop.

6. A voice coil motor having a generally rectangular armature with inside and outside surfaces, a first generally polygonal magnet on a first part of said inside surface, a second generally polygonal magnet on a second part of said inside surface at a location approximately on the opposite side of said armature from said first part, a gap between the two magnets with a movable coil in said gap, said magnets projecting into the inside surface by a distance which is progressively greater near the center of the magnets so that the armature cross sectional area A is related to the distance D along the interface between magnet and armature substantially by the formula: $A = kD$, where k is a constant.

7. The motor of claim 6 in which said first magnet is generally pentagonal, and said second magnet is generally triangular.

* * * * *